(12) United States Patent
Stull

(10) Patent No.: US 11,084,234 B2
(45) Date of Patent: Aug. 10, 2021

(54) RAPID REPAIR OF PNEUMATIC TIRE WITH DAMAGE BY CUT OR TEAR

(71) Applicant: Honda Motor Co., Ltd., Tokyo (JP)

(72) Inventor: Brock J. Stull, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 754 days.

(21) Appl. No.: 15/938,298

(22) Filed: Mar. 28, 2018

(65) Prior Publication Data

US 2019/0299549 A1 Oct. 3, 2019

(51) Int. Cl.
*B29C 73/06* (2006.01)

(52) U.S. Cl.
CPC ................. *B29C 73/066* (2013.01)

(58) Field of Classification Search
CPC ......... B29C 73/14; B29C 73/00; B29C 73/04; B29C 73/28; B29C 73/08; B28C 73/08; B25B 1/08; B25B 1/2473; B25B 5/04; B25B 5/08; B25B 5/10; B25B 13/18; B25B 13/24; B25B 13/32; B25B 13/38; B23Q 3/06; B60C 25/00; B29L 2030/00
USPC ..... 81/15.2, 15.3, 15.4, 15.5, 15.7; 269/143, 269/66, 138, 196, 217, 229, 231, 233, 269/236, 3, 6, 95
See application file for complete search history.

(56) References Cited

U.S. PATENT DOCUMENTS

| 1,000,524 A | 8/1911 | Kaul |
| 1,055,552 A | 3/1913 | Payne |
| 1,131,162 A | 3/1915 | Sackett |
| 1,140,718 A | 5/1915 | Sampson |
| 1,143,141 A | 6/1915 | Rood |
| 1,215,719 A | 2/1917 | Sampson |
| 1,294,322 A * | 2/1919 | Swint ...................... B29C 73/14 152/369 |
| 1,310,831 A | 7/1919 | Huntoon |
| 2,419,270 A | 4/1947 | Linnartz |
| 3,979,169 A | 9/1976 | Whittle |
| 4,805,505 A * | 2/1989 | Cantlin .................. B27B 27/08 269/236 |
| 5,156,508 A | 10/1992 | Grisley |
| 5,350,481 A | 9/1994 | Shepard et al. |

(Continued)

FOREIGN PATENT DOCUMENTS

| FR | 2802106 A1 | 6/2001 |
| GB | 2329880 A | 4/1999 |

(Continued)

*Primary Examiner* — Joseph J Hail
*Assistant Examiner* — Timothy B Brady
(74) *Attorney, Agent, or Firm* — American Honda Motor Co., Inc.; Joshua Freier

(57) ABSTRACT

A tire patch clamp assembly for sealing a cut in a pneumatic tire may include an inner plate inserted through the cut and placed on an inside surface of the pneumatic tire. An outer plate is placed on an outside surface of the pneumatic tire. The outer plate is coupled to the inner plate with a threaded rod and a secondary pin. A nut is coupled to the inner plate for receiving the threaded rod. A cam handle assembly is attached to the threaded rod and extends from the outer plate. The cam handle assembly turns the threaded rod in the nut to adjust the distance between the inner plate and the outer plate until the cut is sealed between the inner plate and the outer plate.

20 Claims, 14 Drawing Sheets

(56) References Cited

U.S. PATENT DOCUMENTS

| | | | | |
|---|---|---|---|---|
| 5,941,153 | A | * | 8/1999 | Chang .................. B23D 49/007 83/662 |
| 6,668,479 | B1 | * | 12/2003 | Obong ...................... F41A 9/63 206/3 |
| 7,559,716 | B2 | | 7/2009 | Ganter |
| 2007/0069092 | A1 | * | 3/2007 | Tamm .................... H02G 7/056 248/231.31 |
| 2011/0285070 | A1 | * | 11/2011 | Hovarter ............... B25B 1/2431 269/167 |
| 2013/0240685 | A1 | * | 9/2013 | Bundren ............... F16L 3/1211 248/74.1 |
| 2017/0173899 | A1 | * | 6/2017 | Schlegelmilch ........ B29C 73/14 |

FOREIGN PATENT DOCUMENTS

| | | | |
|---|---|---|---|
| WO | 9313932 | A1 | 7/1993 |
| WO | 2005058585 | A1 | 6/2005 |

\* cited by examiner

RAPID REPAIR OF PNEUMATIC TIRE WITH DAMAGE BY CUT OR TEAR

BACKGROUND

Pneumatic tires for off-road vehicles are more prone for cuts or tears since they are typically driven on a lower air pressure. For example, pneumatic tires for off-road vehicles are typically driven on 2.5 to 4.0 pounds per square inch (psi). The lower air pressure maximizes traction and ride comfort. However, the lower air pressure also allows the pneumatic tire to compress easily. Depending on the geographic region, off road vehicle s may be driven on terrain with many rocks. As a result, the pneumatic tire may become pinched between a rock and the wheel or rim. This can result in a cut or tear in the pneumatic tire. The cut or tear is typically formed in the sidewall of the pneumatic tire.

Many riders of off-road vehicles may carry a tire plug repair kit to repair a hole or cut in a tire. However, a tire plug repair kit is generally only effective at repairing small diameter punctures. Alternatively, other riders of off-road vehicles may carry a spare wheel and tire. The addition of a spare wheel and tire adds expense since an additional pneumatic tire mounted on a wheel or rim is needed. Mounting hardware is also typically needed to affix the spare wheel and tire. The spare wheel and tire and mounting hardware also adds weight to the off-road vehicle. It would therefore be desirable to provide tire patch clamp assembly that can seal a cut or tear in the pneumatic tire of an off-road vehicle without the use of additional tools or spare parts.

BRIEF SUMMARY

In accordance with one embodiment of the present disclosure, a tire patch clamp assembly for sealing a cut in a pneumatic tire may include an inner plate inserted through the cut and placed on an inside surface of the pneumatic tire. An outer plate is positioned on an outside surface of the pneumatic tire. The outer plate is coupled to the inner plate with a threaded rod and a secondary pin. A nut is coupled to the inner plate for receiving the threaded rod. A cam handle assembly is attached to the threaded rod and extends from the outer plate. The cam handle assembly turns the threaded rod into the nut to adjust the distance between the inner plate and the outer plate until the cut is sealed between the inner plate and the outer plate. The cam handle assembly is pivoted into a recessed channel in the top of the outer plate to prevent rotation after the tire patch clamp assembly is installed.

In accordance with yet another embodiment of the present disclosure, a tire patch clamp assembly for sealing a cut in a pneumatic tire may include an inner plate inserted through the cut and placed on an inside surface of the pneumatic tire. An outer plate with a recessed channel is positioned on an outside surface of the pneumatic tire. The outer plate is coupled to the inner plate with a threaded rod and a secondary pin. The inner plate has a threaded hole for receiving the threaded rod. The threaded rod has a fastener head extending from the recessed channel of the outer plate. The fastener head is engaged with a tool to turn the threaded rod in the threaded hole adjusting the distance between the inner plate and the outer plate until the cut is sealed between the inner plate and the outer plate.

In accordance with yet another embodiment of the present disclosure, a tire patch clamp for sealing a cut in a pneumatic tire may include an inner plate with a threaded hole inserted through the cut. The inner plate with the threaded hole is positioned on an inside surface of the pneumatic tire. An outer plate is placed on an outside surface of the pneumatic tire and aligned with the inner plate. A threaded rod with a cam handle is inserted through the outer plate and into the threaded hole in the inner plate. The cam handle is turned to rotate the threaded rod into the threaded hole to adjust the distance between the inner plate and the outer plate until the cut is sealed between the inner plate and the outer plate. The cam handle is pivoted into a recessed channel in the top of the outer plate to prevent rotation after the tire patch clamp is installed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Embodiments are hereinafter described in detail in connection with the views and examples of FIGS. 1-11, wherein like numbers indicate the same or corresponding elements throughout the views. It should, of course, be understood that the description and drawings herein are merely illustrative and that various modifications and changes can be made in the structures disclosed without departing from the concepts of the present disclosure.

Figure 1:
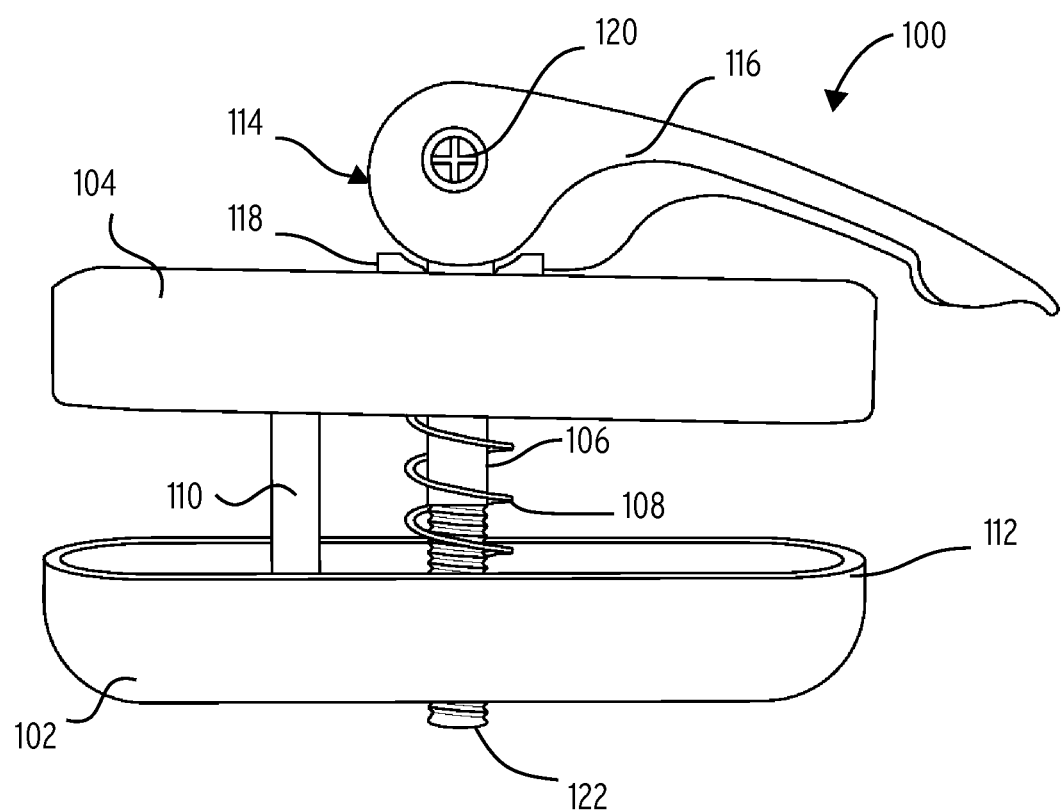
FIG. 1 is a perspective view of an exemplary embodiment of the tire patch clamp assembly in an open position.

FIG. 1 is a perspective view of a first embodiment of a tire patch clamp assembly 100 in an open position. In the exemplary embodiment, the tire patch clamp assembly 100 includes an inner plate 102 coupled to an outer plate 104 using a threaded rod 106 and a secondary pin 110. An axial spring 108 is placed around the threaded rod 106 and between the inner plate 102 and the outer plate 104 for facilitating easier installation and removal.

A cam handle assembly 114 is comprised of a cam handle 116 and a seat member 118, which is attached to the threaded rod 106 with a cam handle attachment 120. The cam handle assembly 114 is best shown in FIG. 3.

Figure 2:
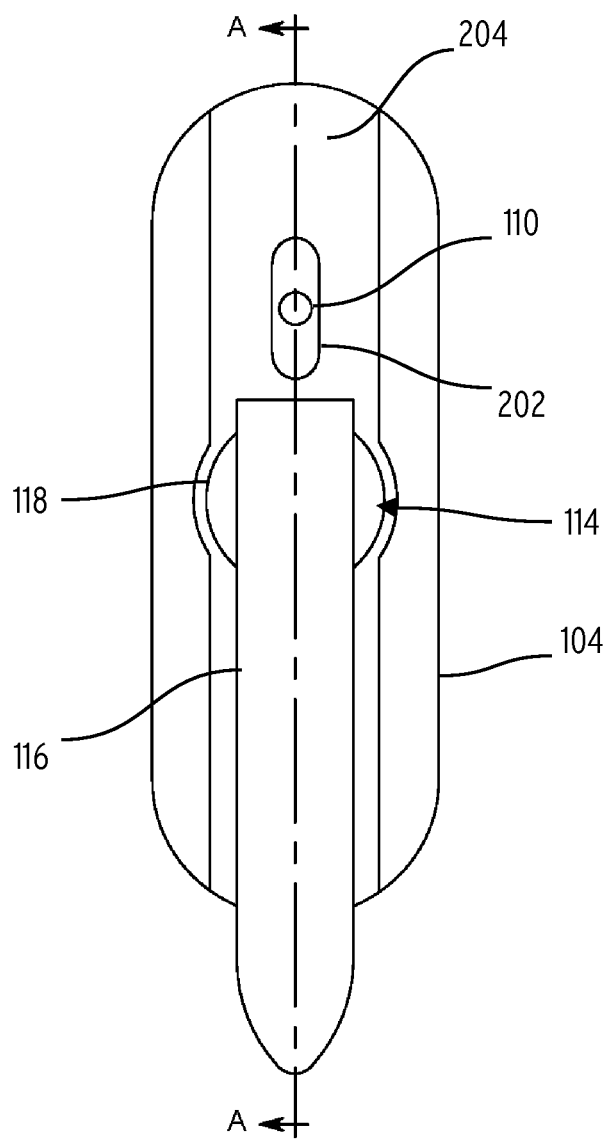
FIG. 2 is a top view of FIG. 1.

FIG. 2 is a top view of the tire patch clamp assembly 100 of FIG. 1. As shown in FIG. 2, the secondary pin 110 is positioned through a guide hole 202 in the outer plate 104. The guide hole 202 may be slotted and is larger in diameter than the secondary pin 110 to allow adjustability of the coupling between the inner plate 102 and the outer plate 104. Additionally, a recessed channel 204 is shown in FIG. 2. The recessed channel 204 allows the cam handle 116 to nest in the top surface of the outer plate 104 and prevents the cam handle assembly 114 from rotating when in the vehicle is in use.

Figure 3:
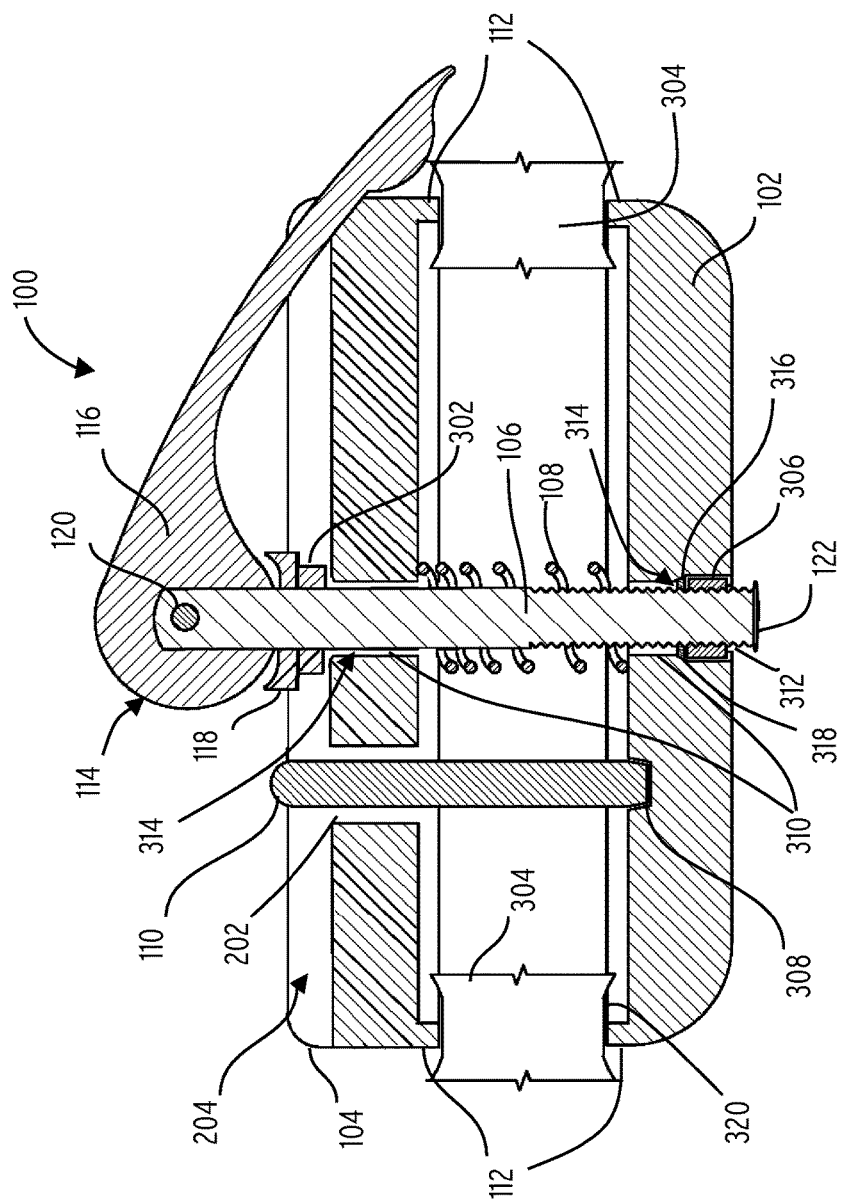
FIG. 3 is a cross-sectional view of FIG. 2 on section line AA in a closed position with a pneumatic tire therebetween.

FIG. 3 is a cross-sectional view of the first embodiment of the tire patch clamp assembly 100 of FIG. 2 taken along section line AA in a closed position with a pneumatic tire 304 therebetween. The tire patch clamp assembly 100 is comprised of the inner plate 102, which is inserted through a cut or tear in a pneumatic tire 304. The threaded rod 106 is positioned inside a thru-hole 310 in the outer plate 104 and the inner plate 102 and into a nut 306 coupled to the inner plate 102. The inner plate 102 is coupled to the outer plate 104 when the threaded rod 106 is engaged with the nut 306. After the end of the threaded rod 106 has traveled out of the nut 306, the end of the threads may be peened or enlarged to prevent the threaded rod 106 from rotating out of the nut 306. As shown in FIG. 3, a peened area 122 is shown at the end of the threads extending from the nut 306.

As shown in FIG. 3, a nut 306 is coupled to the inner plate 102 so that it does not rotate when the threaded rod 106 is engaging the nut 306. It is envisioned that the nut 306 is press fit into a press-fit hole 312, which is smaller in diameter than the outside diameter of the nut 306. The press-fit hole 312 is shown to comprise about half the length of the thru-hole 310 in the inner plate 102; however, the length of the press-fit hole 312 could be greater or less depending on the size of the nut 306 and depth of the inner plate 102.

Figure 4:
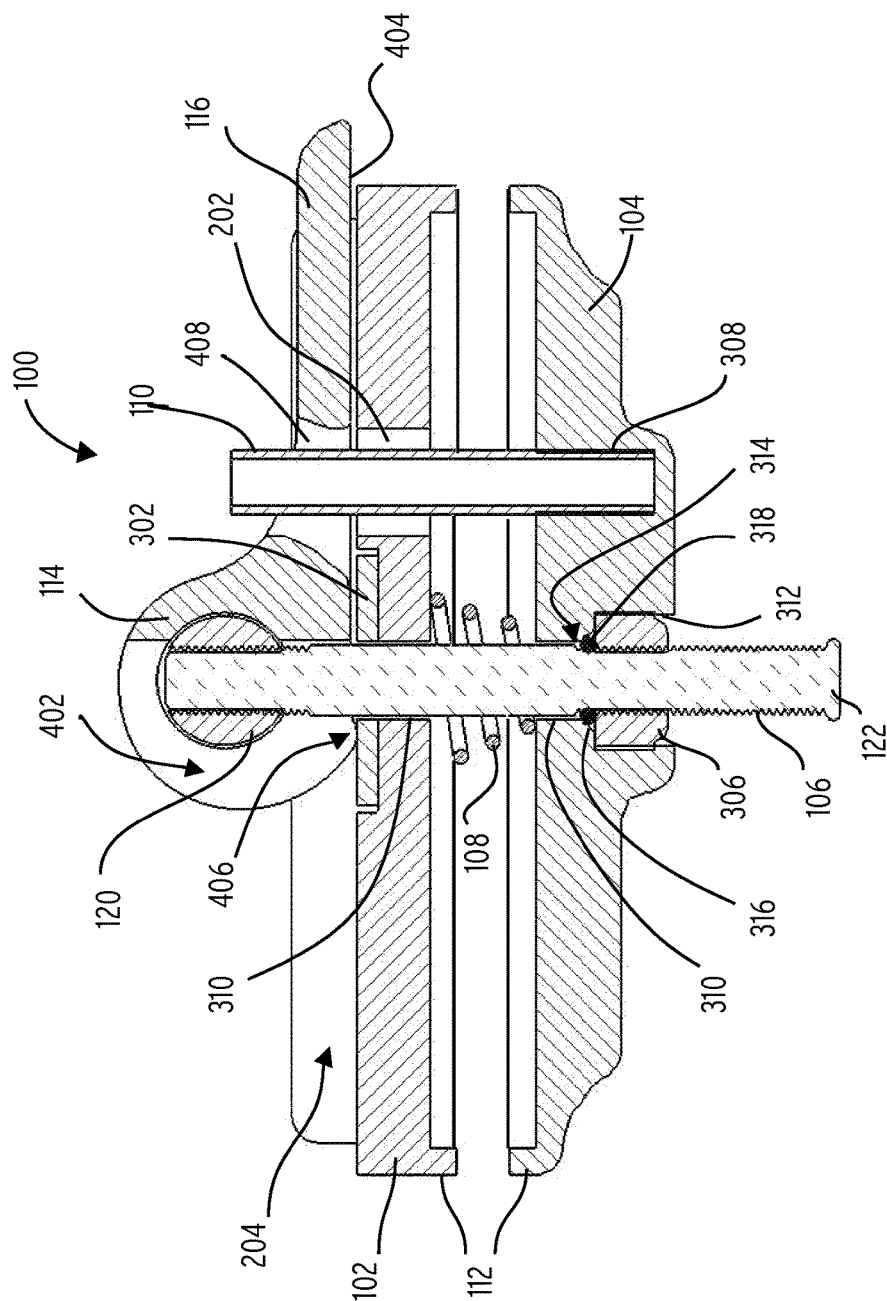
FIG. 4 is a cross-sectional view of FIG. 2 on section line AA in a closed position with another type of cam handle assembly.
Figure 5:
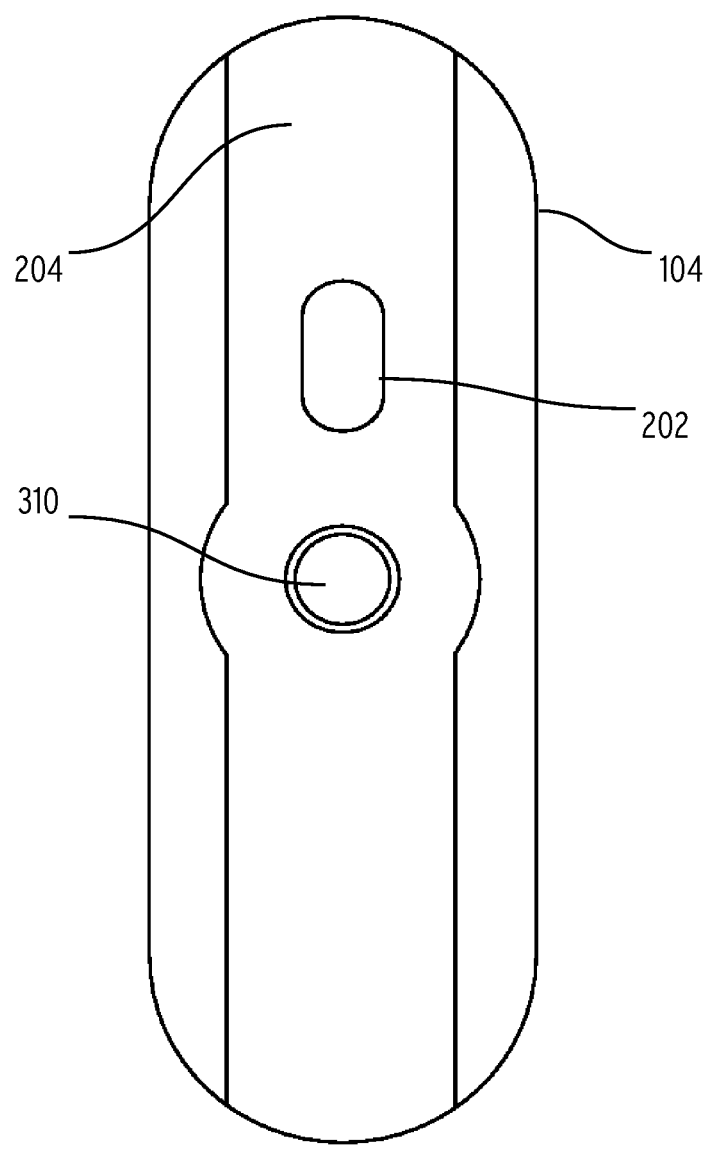
FIG. 5 is a top view of the outer plate shown in FIG. 1.

As shown in FIGS. 3 and 4, the press-fit hole 312 is sized so that the nut 306 can be securely pressed into position inside the inner plate 102. The press-fit hole 312 diameter is chosen based on the application, materials used, and is known to those of ordinary skill in the art.

The nut 306 may be a nylon nut where a polymer insert is placed at the end of the inner diameter of the nut 306 to increase resistance when the threaded rod 106 is engaged. It will be appreciated that the nut 306 may also be held securely by other methods such as welding, swaging, or adhesive application to prevent rotation when engaged with the threaded rod 106.

As shown in FIG. 1 and FIG. 3, the secondary pin 110 is also used to couple the inner plate 102 and the outer plate 104. The secondary pin 110 is utilized to provide a rotational coupling between the inner plate 102 and the outer plate 104. As shown in FIG. 3, the secondary pin 110 is inserted through a guide hole 202 in the outer plate 104 and into a compressing hole 308 in the inner plate 102. The compressing hole 308 is smaller in diameter than the secondary pin 110 to secure the secondary pin 110 to the inner plate 102. The secondary pin 110 may be a slotted slit pin or spring pin, which are commonly used to secure two or more components together as shown in FIG. 4. It will be appreciated that the secondary pin 110 may also be inserted through a guide hole 202 in the inner plate 102 and into a compressing hole 308 in the outer plate 104. Additionally, the secondary pin may be secured by threads or adhesives.

The compressing hole 308 may be chamfered to facilitate insertion of the secondary pin 110. Once the secondary pin 110 is inserted into the compressing hole 308, the retention force applied by the secondary pin 110 against the diameter of the compressing hole 308 retains it in the compressing hole 308. As a result, the inner plate 102 and the outer plate 104 are also coupled. The addition of the secondary pin 110 allows for rotational coupling between the inner plate 102 and the outer plate 104 by keeping the inner plate 102 and the outer plate 104 in alignment when tightening the threaded rod 106 into the nut 306.

As shown in FIG. 1 and FIG. 3, the cam handle assembly 114 is attached to the end of the threaded rod 106 extending from the thru-hole 310 in the top surface of the outer plate 104. The cam handle assembly 114 includes a cam handle 116 attached to the threaded rod 106 with a cam handle attachment 120. The cam handle attachment 120 may be a pin as shown in FIG. 3. Additionally, the cam handle attachment 120 may be a threaded member, such as a barrel nut, for attaching to the threaded rod 106, as shown in FIG. 4. The cam handle 116 may also include a slotted opening 402 to allow it to be attached to the threaded rod 106. Additionally, the slotted opening 402 in FIG. 4 allows for the cam handle 116 to pivot from an open to a closed position. When in the open position, the slotted opening 402 allows the cam handle 116 to remain in an upright position.

The cam handle assembly 114 may include a seat member 118 at its base. As shown in FIG. 3, the seat member 118 is contoured on its top surface to match the contour of the cam handle 116. A washer 302 is positioned beneath the seat member 118 on the top surface of the thru-hole 310 in the outer plate 104.

FIG. 3 depicts the inner plate 102 of the tire patch clamp assembly 100 inserted through a cut or tear in the pneumatic tire 304. The inner plate 102 of the tire patch clamp assembly 100 is inserted approximately perpendicular to the cut or tear for easier installation. Once inserted, the tire patch clamp assembly 100 is rotated approximately 90 degrees so that it is parallel to the cut or tear. The tire patch clamp assembly 100 is then further positioned so the cut or tear is centered between the raised surface 112 of the inner plate 102 and the raised surface 112 of the outer plate 104. Once in position, the cam handle 116 of the cam handle assembly 114 is turned to rotate the threaded rod 106 into the nut 306 and compress the inner plate 102 and the outer plate 104. An axial spring 108 is placed around the threaded rod 106 and between the inner plate 102 and the outer plate 104 for facilitating easier installation and removal.

After the inner plate 102 and outer plate 104 have been compressed enough to produce a sealing force around the cut or tear in the pneumatic tire 304, the cam handle 116 is pivoted downward into a closed position and into a recessed channel 204, as shown in FIG. 3. By pivoting the cam handle 116 into the closed position, the gap between the washer 302 and the seat member 118 is reduced. As a result, more clamping force is applied and the cam handle assembly 114 can remain in the closed position.

FIG. 3 shows the thru-hole 310 in the inner plate 102 to have a chamfered surface 316 above the nut 306. An o-ring 318 is placed on the threaded rod 106 above the nut 306 in the chamfered surface 316 for sealing the thru-hole 310 and preventing air loss after the tire patch clamp assembly 100 is installed. The chamfered surface 316 allows for better sealing and resistance to cuts from a sharp surface in the thru-hole 310 of the inner plate 102. The cam handle 116 of the cam handle assembly 114 is positioned in the recessed channel 204 after installation to prevent the cam handle assembly 114 from rotating after installation. This allows the pneumatic tire 304 with the tire patch clamp assembly 100 installed on a cut or tear to be driven on without losing clamping pressure.

The cam handle 116 is shown to be curved on its outside surface; however, it will be appreciated that the cam handle 116 may also include a flat surface 404 to facilitate a more secure fit into the recessed channel 204, as shown in FIG. 4. A cam handle 116 with a flat surface 404 has better engagement in the recessed channel 204 due to more points of contact. The cam handle assembly 114 in FIG. 4 does not include a seat member 118 since the flat surface 404 can engage the washer 302. The cam handle 116 surface may be modified to be asymmetrical to lessen the amount of force required to pivot the cam handle 116 into a closed position, as shown in FIG. 4.

Additionally, the cam handle 116 may include a fulcrum contact 406 to further secure the cam handle assembly 114 into the recessed channel 204, as shown in FIG. 4. The cam handle 116 with the fulcrum contact 406 requires additional force for the cam handle assembly 114 to be pivoted out of the recessed channel 204. A cam handle 116 with flat surface 404 and fulcrum contact 406 further prevents rotation of the cam handle 116 once sealed over a cut or tear in a pneumatic tire 304.

The thru-hole 310 in both the outer plate 104 and the inner plate 102 or the threaded rod 106 may be coated with grease. A grease coating area 314 is encompassing the threaded rod 106 as shown in FIG. 3. The grease coating area 314 lubricates the components of the tire patch clamp assembly 100 and helps to prevent air loss from the thru-hole 310 once the tire patch clamp assembly 100 is installed on a cut or tear in a pneumatic tire 304. Additionally, the grease coating area 314 in the inner plate 102 helps to lubricate and prevent degradation of the o-ring 318.

After the tire patch clamp assembly 100 has been installed, the cut in the pneumatic tire 304 is sealed between the inner plate 102 and an inside surface 320 of the pneumatic tire 304. The o-ring 318 and the grease coating area 314 prevents air loss after the cut is sealed.

To remove the tire patch clamp assembly 100, the cam handle 116 is pivoted upward out of the recessed channel 204 to relieve clamping pressure. The cam handle 116 is then rotated to turn the threaded rod 106 out of the nut 306. As a result, the gap between the inner plate 102 and the outer plate 104 is increased and the compression against the pneumatic tire 304 is reduced.

Figure 6:
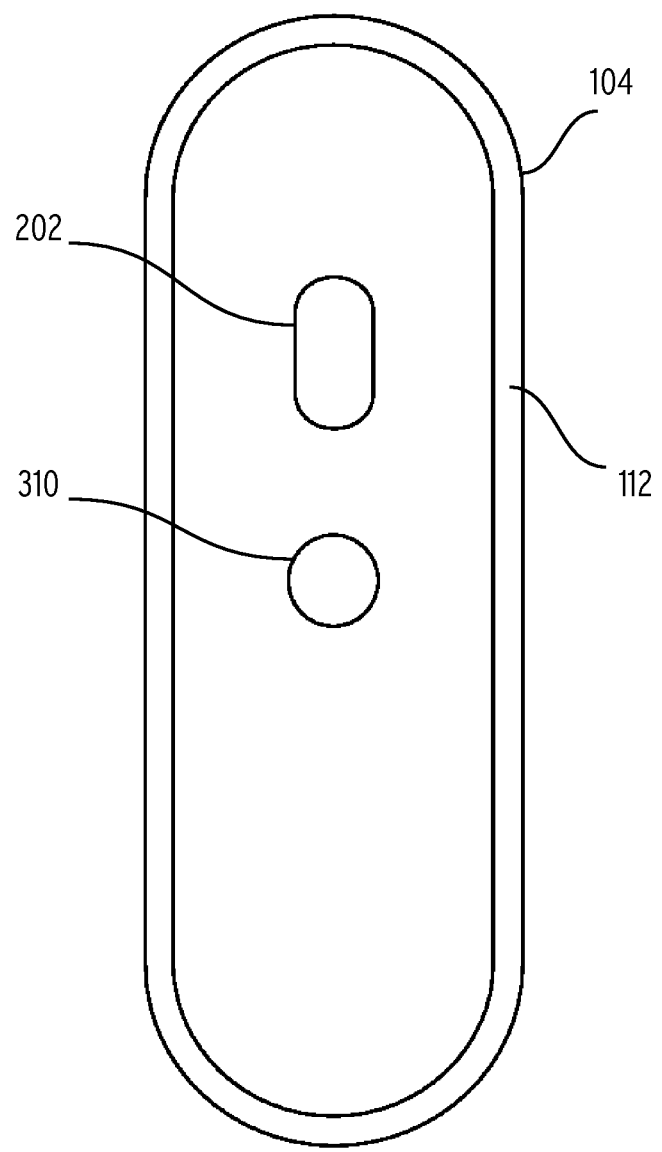
FIG. 6 is a bottom view of the outer plate shown in FIG. 1.

FIG. 6 is a bottom view of the outer plate 104 shown in FIG. 1. The bottom surface of the outer plate 104 is machined so that a raised surface 112 is present along the entire outer edge of the outer plate 104. The raised surface 112 allows more clamping pressure to be applied to the pneumatic tire 304 when the tire patch clamp assembly 100 is installed.

Figure 7:
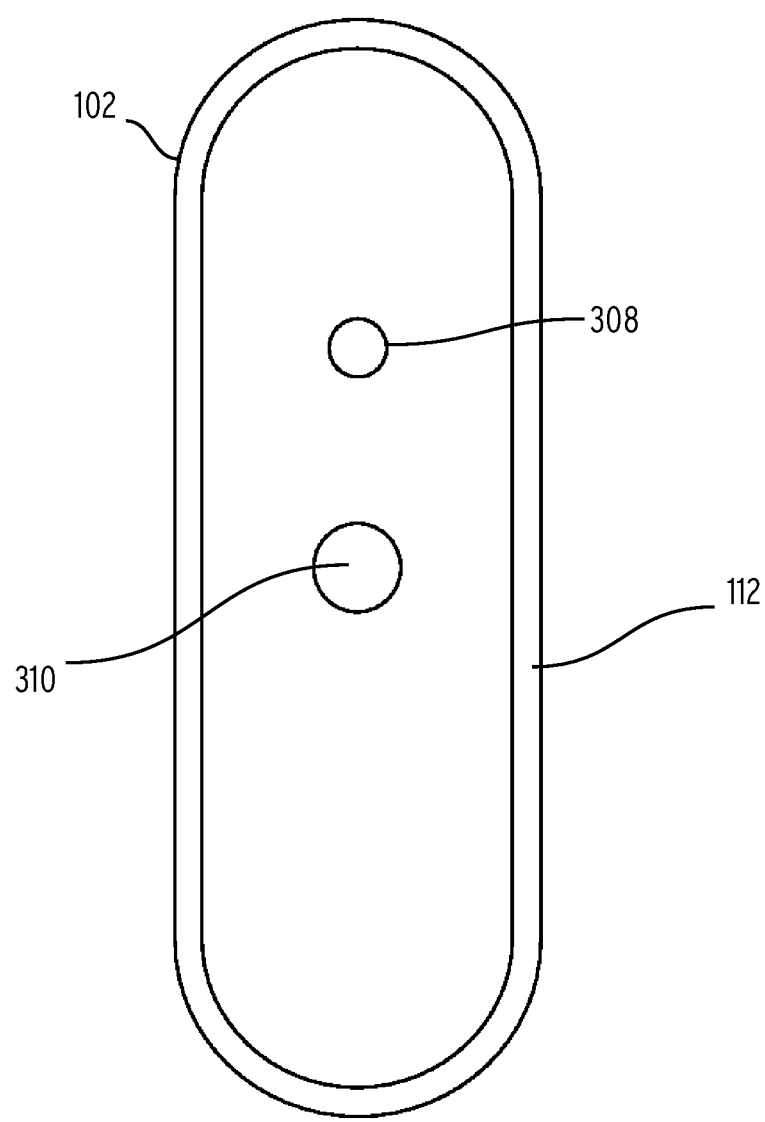
FIG. 7 is a top view of the inner plate shown in FIG. 1.

FIG. 7 is a top view of the inner plate 102 shown in FIG. 1. The top surface of the inner plate 102 is machined so that a raised surface 112 is present along the entire outer edge of the inner plate 102. The raised surface 112, also shown in FIG. 3, allows more clamping pressure to be applied to the pneumatic tire 304 when the tire patch clamp assembly 100 is installed. The bottom of outer plate 104 shown FIG. 6 and the top of the inner plate 102 shown in FIG. 7 are facing each other when coupled together with the threaded rod 106 and the secondary pin 110.

Figure 8:
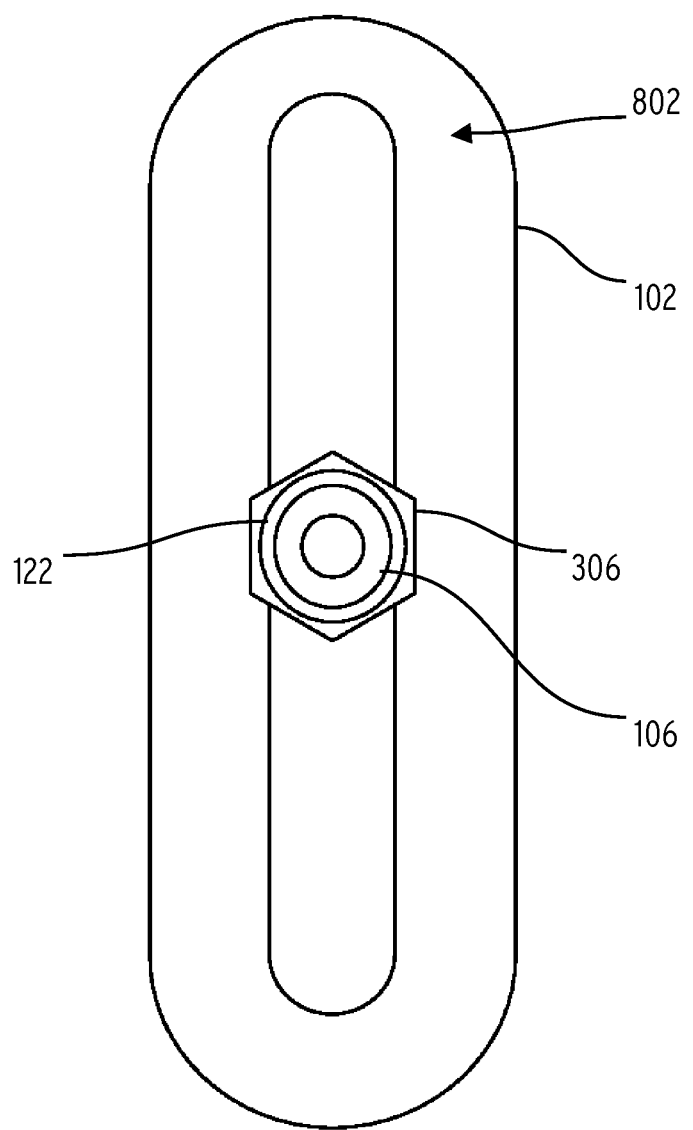
FIG. 8 is a bottom view of the inner plate shown in FIG. 1.

FIG. 8 is a bottom view of the inner plate 102 shown in FIG. 1. The inner plate 102 has a contoured surface 802 to assist with positioning the inner plate 102 through the cut in the pneumatic tire 304. Additionally, the inner plate 102 may be thinner in thickness than the outer plate 104 to further assist with positioning through the cut in the pneumatic tire 304.

Figure 9:
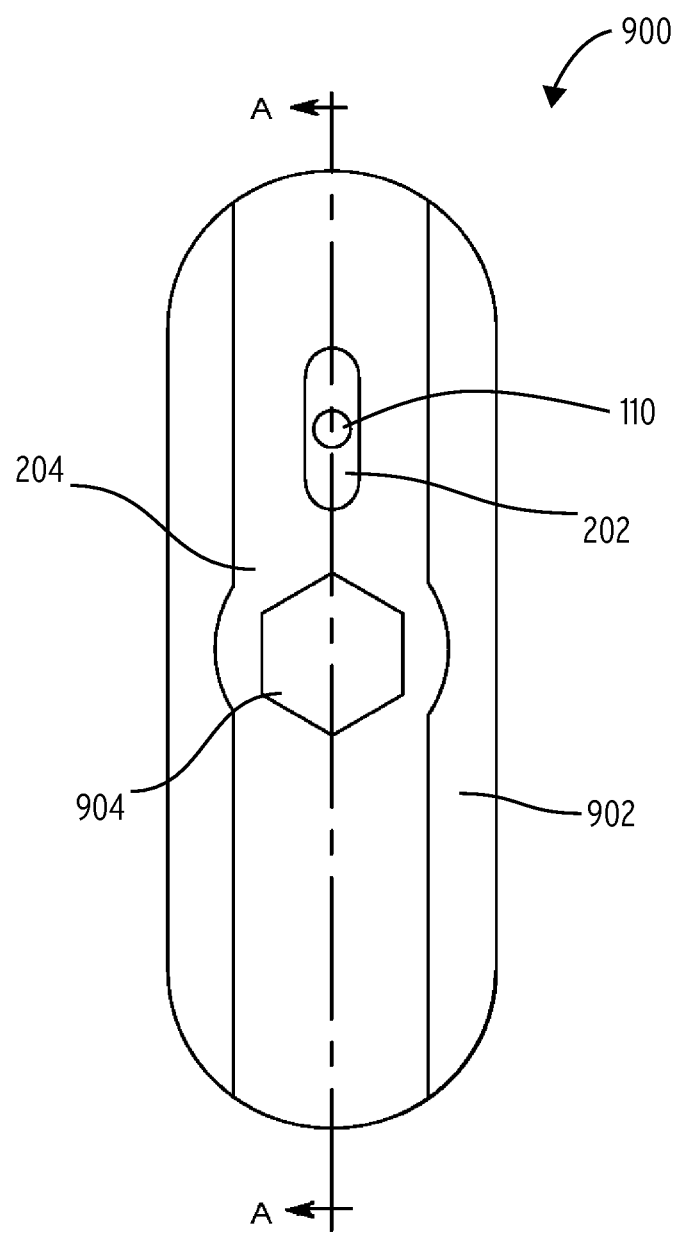
FIG. 9 is a top view of an alternative embodiment of the tire patch clamp assembly.
Figure 10:
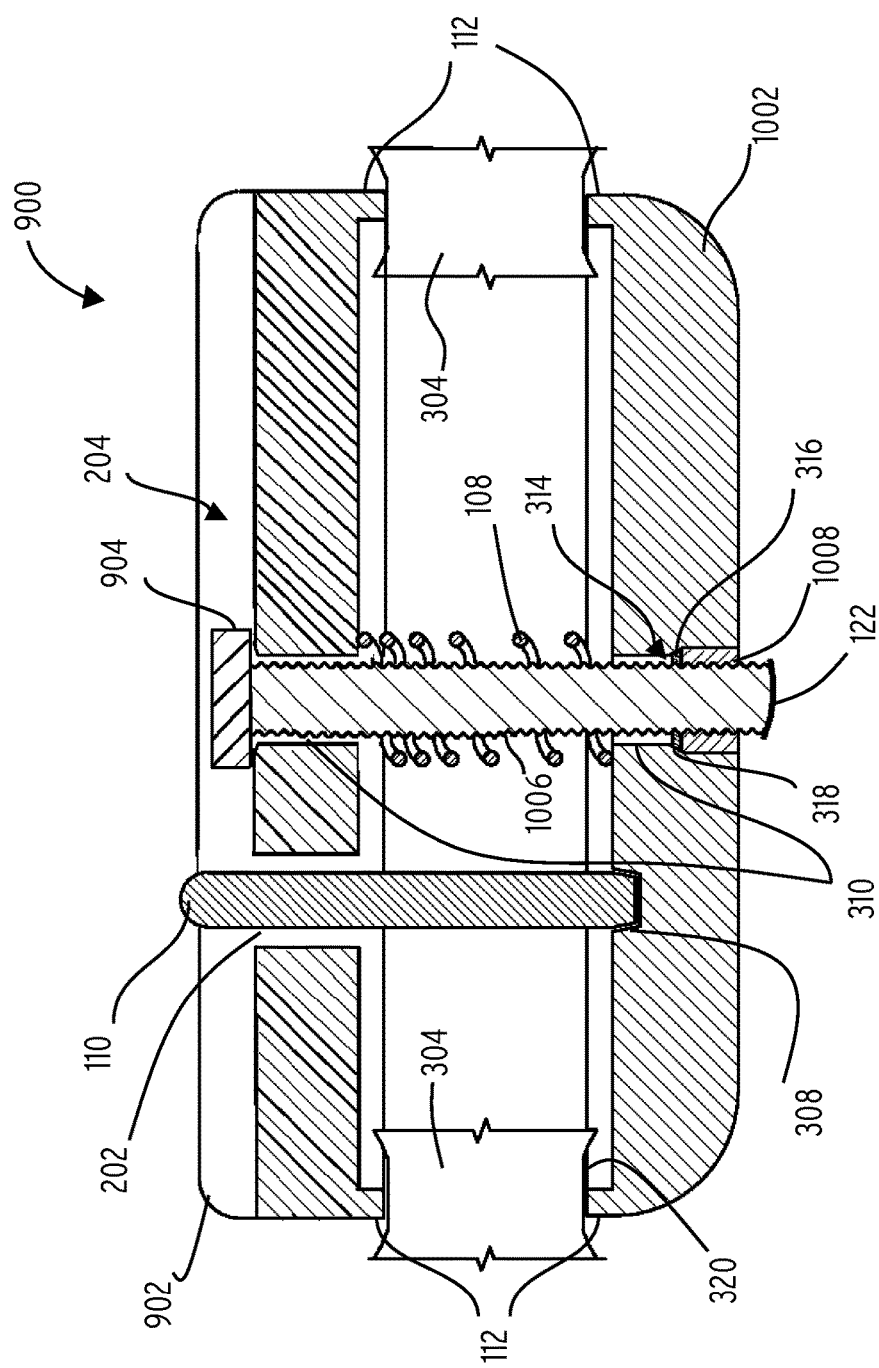
FIG. 10 is a cross-sectional view of FIG. 9 on section line AA in a closed position with a pneumatic tire therebetween.

FIG. 9 is a top view of an alternative embodiment of a tire patch clamp assembly 900. As shown in FIG. 10, the secondary pin 110 is positioned through a guide hole 202 in the outer plate 902. The guide hole 202 may be slotted and is larger in diameter than the secondary pin 110 to allow the outer plate 902 to be adjusted.

In the alternative embodiment, the tire patch clamp assembly 900 includes an inner plate 1002 coupled to an outer plate 902 using a threaded rod 1006 with a fastener head 904 and a secondary pin 110, as shown in FIG. 10. The inner plate 1002 is inserted through a cut or tear in a pneumatic tire 304. The threaded rod 1006 is positioned inside a thru-hole 310 in the outer plate 902 and the inner plate 1002 and into a threaded hole 1008 in the inner plate 1002. The inner plate 1002 is coupled to the outer plate 902 when the threaded rod 1006 with the fastener head 904 is engaged with the threaded hole 1008.

The threaded rod 1006 with the fastener head 904 is engaged with a tool (not shown) to turn the threaded rod 1006 in the threaded hole 1008 adjusting the distance between the inner plate 1002 and the outer plate 902 until the cut is sealed between the inner plate 1002 and an inside surface 320 of the pneumatic tire 304. The fastener head 904 is envisioned to be a hexagonal on the end of the threaded rod 1006 to engage with a socket. However, it will be appreciated that the fastener head 904 may include other shapes to engage another tool, such as: torx, phillips, square, and other fastener head shapes that are common in the art. The end of the threads of the threaded rod 1006 may be peened or enlarged to prevent the threaded rod 1006 from rotating out the threaded hole 1008. A peened area 122 is shown in FIG. 10 at the end of the threads extending from the threaded hole 1008.

Additional details of the alternative embodiment tire patch clamp assembly 900 may be similar to the first embodiment. For example, as shown in FIGS. 1, 3 and 4, the secondary pin 110 is also used to couple the inner plate 1002 and the outer plate 902. The secondary pin 110 is utilized to provide a rotational coupling between the inner plate 1002 and the outer plate 902. As shown in FIG. 10, the secondary pin 110 is inserted through a guide hole 202 in the outer plate 902 and into a compressing hole 308 in the inner plate 1002. The compressing hole 308 is smaller in diameter than the secondary pin 110 to secure the secondary pin 110 to the inner plate 1002. The secondary pin 110 is envisioned to be a slotted slit pin or spring pin, as shown in FIG. 4, which are commonly used to secure two or more components together. Additionally, the secondary pin may be secured by threads or adhesives.

Figure 12:
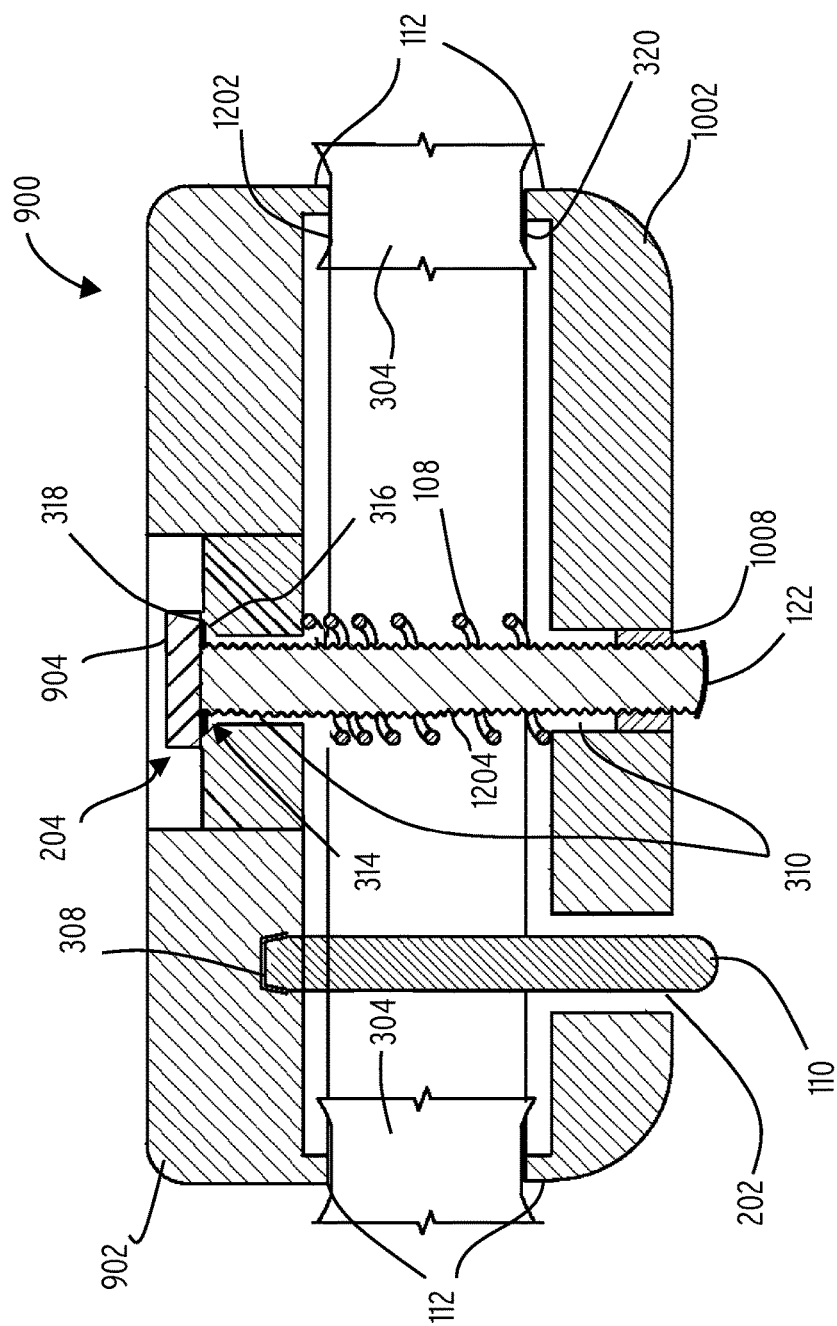
FIG. 12 is a cross-sectional view of FIG. 11 on section line AA in a closed position with a pneumatic tire therebetween.
Figure 13:
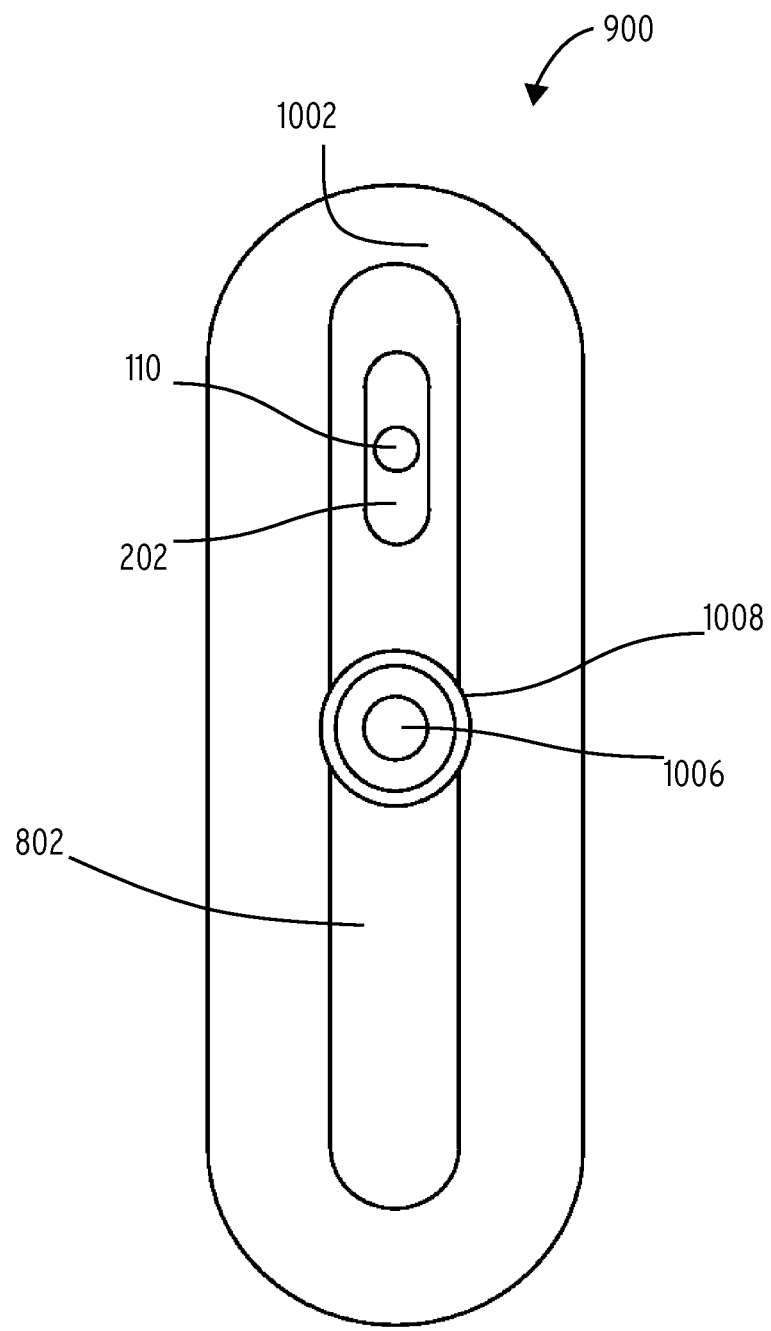
FIG. 13 is a bottom view of the outer plate shown in FIG. 12.

It will be appreciated that the secondary pin 110 may also be inserted through a guide hole 202 in the inner plate 1002 and into a compressing hole 308 in the outer plate 902, as shown in FIG. 12.

The compressing hole 308 may be chamfered to facilitate insertion of the secondary pin 110. Once the secondary pin 110 is inserted into the compressing hole 308, the retention force applied by the secondary pin 110 against the diameter of the compressing hole 308 retains it in the compressing hole 308. As a result, the inner plate 1002 and the outer plate 902 are coupled. The addition of the secondary pin 110 allows for rotational coupling between the inner plate 1002 and the outer plate 902 by keeping the inner plate 1002 and the outer plate 902 in alignment when tightening the threaded rod 1006 into the threaded hole 1008.

FIG. 10 depicts the inner plate 1002 of the tire patch clamp assembly 900 inserted through a cut or tear in the pneumatic tire 304. The inner plate 1002 of the tire patch clamp assembly 900 is inserted approximately perpendicular to the cut or tear for easier installation. Once inserted, the tire patch clamp assembly 900 is rotated approximately 90 degrees so that it is parallel to the cut or tear.

The tire patch clamp assembly 900 is then further positioned so the cut or tear is centered between the raised surface 112 of the inner plate 1002 and the raised surface 112 of the outer plate 902. Once in position, the fastener head 904 of the threaded rod 1006 is turned to rotate the threaded rod 1006 into the threaded hole 1008 and compress the inner plate 1002 and the outer plate 902. An axial spring 108 may be placed around the threaded rod 1006 and between the inner plate 1002 and the outer plate 902 for facilitating easier installation and removal. Alternatively, a circlip (not shown) may be placed around the threaded rod 1006 and against the bottom surface of the outer plate 902 to secure the outer plate 902 to the threaded rod 1006.

Figure 11:
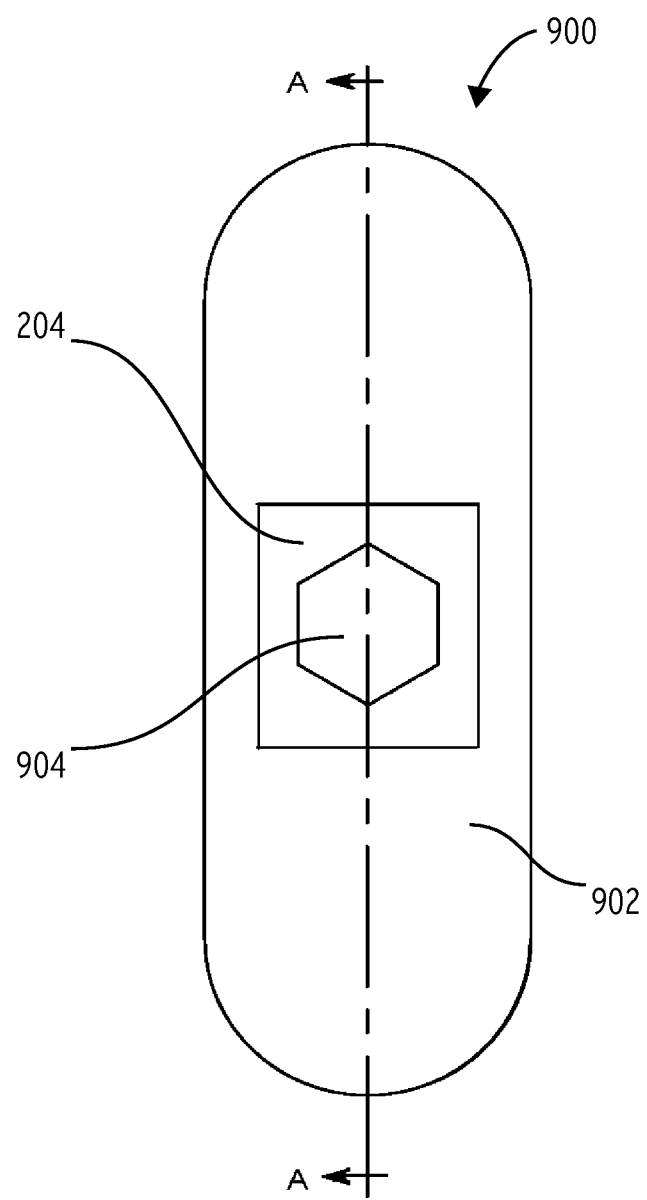
FIG. 11 is another top view of the alternative embodiment of the tire patch clamp assembly with a smaller recessed channel and with the guide hole located on the inner plate.

After the inner plate 1002 and outer plate 902 have been compressed enough to produce a sealing force around the cut or tear in the pneumatic tire 304, the fastener head 904 of the threaded rod 1006 may be inside a recessed channel 204 as shown in FIG. 9 and FIG. 10. The recessed channel 204 allows the fastener head 904 to nest in the top surface of the outer plate 902 and prevents the threaded rod 1006 from rotating when in use on the vehicle. The recessed channel 204 is shown to extend along the entire top surface of the outer plate 902 in FIG. 9 and FIG. 10. However, the recessed channel 204 may encompass a smaller area, as shown in FIG. 11 and FIG. 12.

FIG. 10 shows the thru-hole 310 in the inner plate 1002 to have a chamfered surface 316 above the threaded hole 1008. An o-ring 318 is placed on the threaded rod 1006 above the threaded hole 1008 in the chamfered surface 316 for sealing the thru-hole 310 and preventing air loss after the tire patch clamp assembly 900 is installed. The chamfered surface 316 allows for better sealing and resistance to cuts from a sharp surface in the thru-hole 310 of the inner plate 1002. After the tire patch clamp assembly 900 has been installed, the cut in the pneumatic tire 304 is sealed between the inner plate 1002 and the inside surface 320 of the pneumatic tire 304. The o-ring 318 and the grease coating area 314 prevents air loss after the cut is sealed.

Alternatively, the top of the thru-hole 310 in the outer plate 902 may be chamfered when the secondary pin 110 is extending from the outer plate 902, as shown in FIG. 12. The o-ring 318 may be placed below the fastener head 904 in the chamfered surface 316 for sealing the thru-hole 310 and preventing air loss after the tire patch clamp assembly 900 is installed. The chamfered surface 316 allows for better sealing and resistance to cuts from a sharp surface in the thru-hole 310 of the outer plate 902. After the tire patch clamp assembly 900 has been installed, the cut in the pneumatic tire 304 is sealed between the outer plate 902 and an outside surface 1202 of the pneumatic tire 304. The o-ring 318 and the grease coating area 314 prevents air loss after the cut is sealed.

Similar to the first embodiment as shown in FIG. 3, the thru-hole 310 in both the outer plate 902 and the inner plate 1002 or the threaded rod 1006 may be coated with grease. A grease coating area 314 is encompassing the threaded rod 1006 as shown in FIG. 10. The grease coating area 314 lubricates the components of the tire patch clamp assembly 900 and helps to prevent air loss from the thru-hole 310 once the tire patch clamp assembly 900 is installed on a cut or tear in a pneumatic tire 304. Additionally, the grease coating area 314 in the inner plate 1002 helps to lubricate and prevent degradation of the o-ring 318.

To remove the tire patch clamp assembly 900, the fastener head 904 of the threaded rod 1006 is rotated with the tool to relieve clamping pressure and increase the gap between the inner plate 1002 and the outer plate 902 so that the tire patch clamp assembly 900 can be removed.

Figure 14:
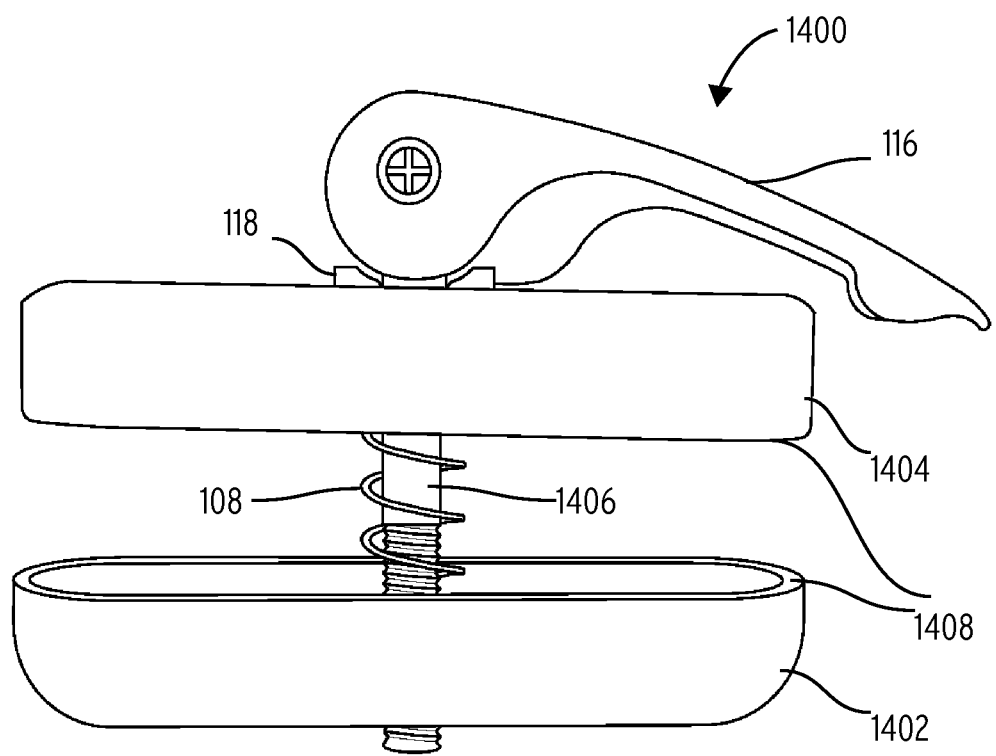
FIG. 14 is a perspective view of an alternative embodiment of the tire patch clamp in an open position.

In an alternative embodiment, a tire patch clamp 1400, as shown in FIG. 14, includes an inner plate 1402. The inner plate 1402 may include a threaded hole 1008, as shown in FIG. 10. The inner plate 1402 is inserted perpendicular through a cut or tear on an inside surface of the pneumatic tire 304. The tire patch clamp 1400 also includes an outer plate 1404. The outer plate 1404 is aligned to the inner plate 1402 on the outside surface of the pneumatic tire 304.

As shown in FIG. 14, a threaded rod 1406 with a cam handle 116 attached is inserted through the outer plate 1404 and into the inner plate 1402. The threaded rod 1406 with the cam handle 116 attached may include an o-ring (not shown) inserted over the threaded rod 1406 before it is inserted into the outer plate 1404 for preventing air loss when the tire patch clamp 1400 is installed.

Also, the threaded rod 1406 with the cam handle 116 attached may include an axial spring 108 inserted over the threaded rod 1406 after it has been inserted through the outer plate 1404 and before it is inserted into the inner plate 1402. An axial spring 108 is placed around the threaded rod 1406 and between the inner plate 1402 and the outer plate 1404 for facilitating easier installation and removal.

Once the threaded rod 1406 is engaged with the threaded hole 1008, the tire patch clamp 1400 is rotated approximately 90 degrees so that it is parallel to the cut or tear. The tire patch clamp 1400 is then further positioned so the cut or tear is centered between the raised surface 1408 of the inner plate 1402 and the raised surface 1408 of the outer plate 1404.

After the cut is centered, the cam handle 116 is turned to rotate the threaded rod 1406 into the threaded hole 1008 and compress the inner plate 1402 and the outer plate 1404 together.

After the inner plate 1402 and outer plate 1404 have been compressed enough to produce a sealing force around the cut or tear in the pneumatic tire 304, the cam handle 116 is pivoted downward into a closed position and into a recessed channel 204, as shown in FIG. 3. By pivoting the cam handle 116 into the closed position, the gap between the washer 302 and the seat member 118 is reduced. As a result, more clamping force is applied and the cam handle assembly 114 can remain in the closed position.

Additional details of the alternate embodiment tire patch clamp 1400 may be similar to the first embodiment. For example, FIG. 3 shows the thru-hole 310 to have a chamfered surface 316 in the inner plate 1402 above the nut 306. An o-ring 318 is placed on the threaded rod 1406 above the nut 306 in the chamfered surface 316 for sealing the thru-hole 310 and preventing air loss after the tire patch clamp assembly 100 is installed. The chamfered surface 316 allows for better sealing with the o-ring 318 and resistance to cuts from a sharp surface from the thru-hole 310 of the inner plate 1402.

Similar to the first embodiment shown in FIG. 3, the grease coating area 314 lubricates the components and prevents air loss through the thru-hole 310 once the tire patch clamp 1400 is installed on a cut or tear in a pneumatic tire 304. Additionally, the grease coating area 314 in the inner plate 102 helps to lubricate and prevent degradation of the o-ring 318.

The cam handle 116 of the cam handle assembly 114 is positioned in the recessed channel 204 after installation to prevent the cam handle assembly 114 from rotating after installation. This allows the pneumatic tire 304 with the tire patch clamp 1400 installed on a cut or tear to be driven on without losing clamping pressure.

After the tire patch clamp 1400 has been installed, the cut in the pneumatic tire 304 is sealed between the inner plate 1402 and the inside surface of the pneumatic tire 304. The o-ring 318 and the grease coating area 314 prevents air loss after the cut is sealed.

The cam handle 116 is shown to be curved on its outside surface; however, it will be appreciated that the cam handle 116 may also include a flat surface 404 to facilitate a more secure fit into the recessed channel 204, as shown in FIG. 4. A cam handle 116 with a flat surface 404 has better engagement in the recessed channel 204 due to more points of contact. Additionally, the cam handle 116 may include a fulcrum contact 406 to further secure the cam handle assembly 114 into the recessed channel 204. The cam handle 116 with a fulcrum contact 406 requires additional force for the cam handle assembly 114 to be pivoted out of the recessed channel 204. A cam handle 116 with a flat surface and a notch further prevents rotation of the cam handle 116 once sealed over a cut or tear in a pneumatic tire 304.

To remove the tire patch clamp 1400, the cam handle 116 is pivoted upward out of the recessed channel 204 to relieve clamping pressure against the seat member 118, the washer 302, and the outer plate 1404. The cam handle 116 can then be rotated to turn the threaded rod 1406 out of the threaded hole 1008. As a result, the gap between the inner plate 1402 and the outer plate 1404 is increased and the compression against the pneumatic tire 304 is reduced.

It will also be understood that the tire patch clamp described above can provide a lightweight and low cost solution for temporarily repairing a cut or tear in a tire. The tire patch clamp allows the vehicle to travel to a location to obtain a more permanent repair.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated.

Embodiments are also intended to include or otherwise cover methods of using and methods of manufacturing the tire patch clamp assembly disclosed above. The methods of manufacturing include or otherwise cover processors and computer programs implemented by processors used to design various elements of the tire patch clamp assembly disclosed above. For example, embodiments are intended to cover processors and computer programs used to design or manufacture the various components of the tire patch clamp assembly used for various manufacturing processes.

The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A tire patch clamp assembly for sealing a cut in a pneumatic tire, comprising:
    an inner plate for being inserted through the cut and placed on an inside surface of the pneumatic tire;
    an outer plate for being placed on an outside surface of the pneumatic tire;
    the outer plate coupled to the inner plate with a threaded rod and a secondary pin;
    the secondary pin is a slotted split pin inserted through a guide hole in the outer plate into a compressing hole in the inner plate;
    a nut coupled to the inner plate receiving the threaded rod;
    a cam handle assembly comprising a cam handle and a seat member attached to a threaded rod with a cam handle attachment; and
    the threaded rod extending from the outer plate, wherein the cam handle assembly turns the threaded rod in the nut adjusting the distance between the inner plate and the outer plate until the cut is sealed between the inner plate and the outer plate.

2. The tire patch clamp assembly of claim 1 wherein the inner plate and the outer plate comprise a raised surface along an outer edge increasing a clamping force against the pneumatic tire.

3. The tire patch clamp assembly of claim 1, comprising an axial spring placed around the threaded rod and between the outer plate and the inner plate facilitating easier separation of the outer plate and the inner plate.

4. The tire patch clamp assembly of claim 1 wherein the nut is secured to the inner plate precluding movement when the threaded rod is rotated.

5. The tire patch clamp assembly of claim 1 wherein the end of the threaded rod inserted through the nut is peened to prevent disassembly.

6. The tire patch clamp assembly of claim 1 wherein the outer plate contains a recessed channel preventing the cam handle assembly from rotating.

7. The tire patch clamp assembly of claim 1 wherein the guide hole in the outer plate is slotted.

8. The tire patch clamp assembly of claim 1 wherein the inner plate comprises a thru-hole with a chamfered surface.

9. The tire patch clamp assembly of claim 8 wherein the chamfered surface inside the thru-hole is sealed with an o-ring on the threaded rod to prevent air from leaking.

10. The tire patch clamp assembly of claim 9 wherein the threaded rod is coated with grease reducing air loss and lubricating the o-ring.

11. A tire patch clamp assembly for sealing a cut in a pneumatic tire, comprising:
    an inner plate for being inserted through the cut and placed on an inside surface of the pneumatic tire;
    an outer plate with a recessed channel for being placed on an outside surface of the pneumatic tire;
    the outer plate coupled to the inner plate with a threaded rod and a secondary pin;
    the inner plate having a threaded hole for receiving the threaded rod;
    the threaded hole comprising a chamfered surface wherein the chamfered surface inside the threaded hole is sealed with an o-ring on the threaded rod to prevent air from leaking; and
    the threaded rod having a fastener head extending from the recessed channel of the outer plate, wherein the fastener head is engaged with a tool to turn the threaded rod in the threaded hole adjusting the distance between the inner plate and the outer plate until the cut is sealed between the inner plate and the outer plate.

12. The tire patch clamp assembly of claim 11 wherein the threaded rod is coated with grease to lubricate and help prevent air loss.

13. The tire patch clamp assembly of claim 11 wherein the the secondary pin allows for rotational coupling between the inner plate and the outer plate by keeping the inner plate and the outer plate in alignment.

14. A tire patch clamp for sealing a cut in a pneumatic tire, comprising:
- an inner plate with a threaded hole for being inserted through the cut placed on an inside surface the pneumatic tire;
- the inner plate comprises a chamfered surface at the end of the threaded hole towards the pneumatic tire;
- the chamfered surface seals against an o-ring on the threaded rod to prevent air from leaking;
- an outer plate with a thru-hole aligned with the inner plate for being placed on an outside surface of the pneumatic tire; and
- a threaded rod with a cam handle assembly comprising a cam handle and a seat member attached to the threaded rod with a cam handle attachment inserted through the thru-hole of the outer plate and into the threaded hole in the inner plate wherein the cam handle assembly turns the threaded rod in the threaded hole adjusting the distance between the inner plate and the outer plate until the cut is sealed between the inner plate and the outer plate.

15. The tire patch clamp of claim 14 wherein the inner plate and the outer plate comprise a raised surface along an outer edge increasing a clamping force against the pneumatic tire.

16. The tire patch clamp of claim 14, comprising an axial spring placed around the threaded rod and between the outer plate and the inner plate facilitating easier separation of the outer plate and the inner plate.

17. The tire patch clamp of claim 14 wherein the tire patch clamp includes a secondary pin to couple the inner plate to the outer plate.

18. The tire patch clamp of claim 14 wherein the cam handle is secured in a recessed channel.

19. The tire patch clamp of claim 14 wherein the outer plate comprises a recessed channel preventing the cam handle assembly from rotating.

20. The tire patch clamp of claim 14 wherein the threaded hole of the inner plate and the thru-hole of the outer plate comprise grease reducing air loss.

* * * * *